United States Patent [19]
Lim et al.

[11] Patent Number: 5,225,295
[45] Date of Patent: Jul. 6, 1993

[54] BI-CELL ELECTRICAL STORAGE BATTERY

[75] Inventors: Hong S. Lim, Agora Hills; Richard S. Bogner, Altadena, both of Calif.

[73] Assignee: Hughes Aircraft Company, Los Angeles, Calif.

[21] Appl. No.: 827,248

[22] Filed: Jan. 29, 1992

[51] Int. Cl.$^5$ ............................................... H01M 2/08
[52] U.S. Cl. .................................... 429/101; 429/149; 429/164; 429/185
[58] Field of Search ............... 429/101, 149, 156, 158, 429/164, 185

[56] References Cited

U.S. PATENT DOCUMENTS

| | | | |
|---|---|---|---|
| 4,546,054 | 10/1985 | Carr et al. | 429/101 |
| 5,030,524 | 7/1991 | Stadnick et al. | 429/101 X |
| 5,082,754 | 1/1992 | Jones | 429/101 |

Primary Examiner—Stephen Kalafut
Attorney, Agent, or Firm—Terje Gudmestad; W. K. Denson-Low

[57] ABSTRACT

A battery (10) comprises a cylindrical pressure vessel (30) having domed ends and an internal impermeable membrane (36) extending transversely to a cylindrical axis (38) of the pressure vessel (30). The impermeable membrane (36) divides the pressure vessel (30) into two compartments (32, 34) of equal size, shape, and volume, and hermetically seals the two compartments (32, 34) against mass flow therebetween. In particular, the membrane (36) prevents the migration of electrolyte between the storage elements located in the two compartments (32, 34). The battery (10) further includes a plurality of plate sets (12) for storing electrical energy, each plate set (12) having a nickel positive electrode (14), a hydrogen negative electrode (16), a separator (18) between the positive electrode (14) and the negative electrode (16), a gas screen (26), and an electrolyte. The active plate sets (12) are arranged with at least two active plate sets (12) in the first compartment (32) electrically connected in parallel to form a first cell stack (40), and at least two active plate sets (12) in the second compartment (32) electrically connected in parallel to form a second cell stack (42). The active cell stack (40) in the first compartment (32) is preferably electrically connected in series with the active cell stack (42) in the second compartment (34).

17 Claims, 1 Drawing Sheet

BI-CELL ELECTRICAL STORAGE BATTERY

BACKGROUND OF THE INVENTION

The present invention relates to a pressurized-gas storage battery, and, more particularly, to such a battery structured for high efficiency and long-term stability.

Rechargeable cells or batteries are electrochemical devices for storing and retaining an electrical charge and later delivering that charge for useful power. Familiar examples of the rechargeable cell are the lead-acid cell used in automobiles, and the nickel-cadmium cell used in various portable electronic devices. Another type of cell having a greater storage capacity for its weight is the nickel oxide/pressurized hydrogen cell, an important type of which is commonly called the nickel-hydrogen cell and is used in spacecraft applications. The weight of the spacecraft storage cell must be minimized while achieving the required performance level, due to the cost of lifting weight to earth orbit and beyond.

The nickel-hydrogen cell includes a series of active plate sets which store an electrical charge electrochemically and later deliver that charge as a useful current. The active plate sets are packaged within a pressure vessel that contains the plate sets and the hydrogen gas that is an essential active component of the cell. Each plate set includes a positive electrode, a negative electrode, and a separator between the two electrodes, all soaked with an electrolyte. In a typical cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen storage cell delivers current at about 1.3 volts, and a number of the cells are usually connected in series to produce current at the voltage required by the systems of the spacecraft.

Although the nickel-hydrogen battery cell has higher theoretical specific energy (electrical energy storage capacity per unit weight) than the nickel-cadmium battery cell, it is bulky and has lower energy density (electrical energy storage capacity per unit volume) than the nickel-cadmium battery cell. The cylindrical shape of the pressure vessel of the nickel-hydrogen battery cell, as compared with the rectilinear shape of the nickel-cadmium battery cell, adds a significant volume of unusable space to the battery. The pressure vessel cannot be significantly redesigned to improve the volumetric efficiency properties of the nickel-hydrogen battery, because its shape is optimized for maximum weight properties while confining the hydrogen pressure that can reach as high as 1000 pounds per square inch during the battery charge/discharge cycle.

There is therefore a need for an improved nickel-hydrogen battery which retains its good weight properties but achieves improved volumetric properties. The battery must also retain its operating characteristics for a long period of time, typically on the order of 15 years for a spacecraft such as a commercial communications satellite. That is, there must be a good certainty that any modification to the nickel-hydrogen battery will not cause the battery to change its performance during the design life. Since it is not possible to conduct 15 year full-life tests of the battery prior to the launch of the satellite, possible failure mechanisms must be anticipated and avoided in the basic battery design.

The present invention fulfills this need for an improved pressurized-gas battery having good weight and volumetric properties, and no added long-term failure mechanisms.

SUMMARY OF THE INVENTION

The present invention provides an improved storage battery, having good weight and volumetric properties. The battery achieves these improvements while ensuring retention of storage performance over long periods of use by preventing mechanisms that can degrade the performance over extended periods. The construction of the battery prevents degradation resulting from migration of the electrolyte between stacks of plate sets which are electrically connected in series as in a common pressure vessel of a nickel-hydrogen battery.

In accordance with the invention, a battery comprises a pressure vessel, and an internal impermeable membrane within the pressure vessel dividing the pressure vessel into two compartments hermetically sealed against mass flow between the compartments. The battery further includes storage means for storing electrical energy, the storage means including at least one active plate set in each of the compartments of the pressure vessel. Each active plate set includes a positive electrode such as a nickel electrode, a negative electrode such as a hydrogen electrode, a separator between the positive electrode and the negative electrode, and an electrolyte such as an aqueous potassium hydroxide solution.

The pressure vessel is preferably formed as a cylindrical housing with domed ends. With such a pressure vessel, the impermeable membrane is positioned perpendicular to the cylindrical axis of the pressure vessel at the midpoint of the pressure vessel, so that the pressure vessel is divided into two compartments of equal size, shape, and volume. The pressure vessel and the impermeable membrane are preferably made of material that does not degrade or become brittle in high-pressure hydrogen, such as Inconel 718 alloy. The impermeable membrane can be relatively thin, on the order of 0.005–0.030 inch thick, since in this design there is little or no pressure differential across the impermeable membrane.

Each of the two compartments desirably contains at least two plate sets, with the plate sets in each compartment connected in parallel. Because the plate sets are connected in parallel, they operate at the same voltages and there is no driving force for migration of electrolyte from one plate set to another, even during extended use of the battery. On the other hand, the plate sets in the different compartments may be connected in series, if desired to attain high voltages from the battery, because electrolyte cannot migrate from one compartment to the other through the impermeable membrane.

Placing multiple plate sets into the interior of the pressure vessel improves the volumetric property of the battery. However, in the absence of the hermetically sealed compartments, the various series-connected plate sets operating at differing voltages could result in degradation of performance over extended periods as a result of electrolyte migration between the plate sets. The use of the impermeable membrane prevents such migration of electrolyte.

The present invention provides an important improvement in the art of pressurized-gas batteries. The volumetric energy density is improved, without the introduction of a mechanism of degradation through electrolyte migration. Other features and advantages of the invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
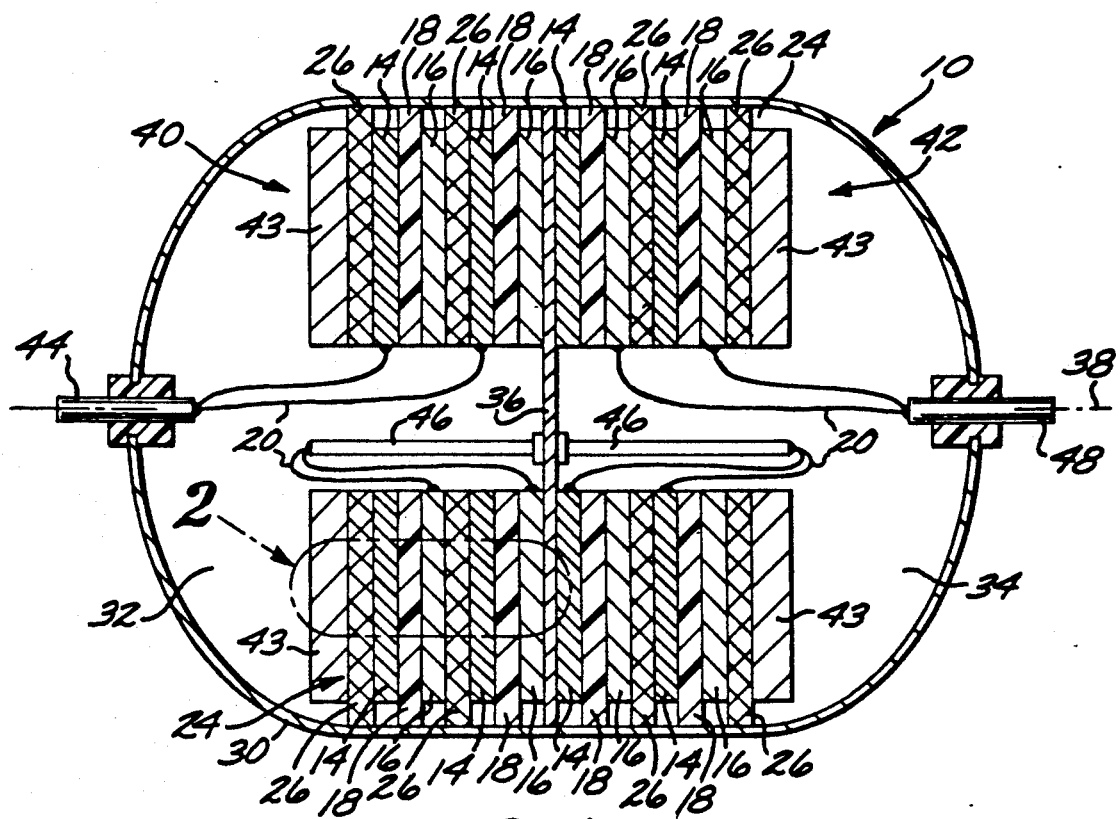
FIG. 1 is a side sectional view of a nickel-hydrogen battery, with electrical connections indicated schematically.

The present invention is preferably embodied in a nickel-hydrogen battery 10 of the pressurized gas-metal cell type. Such a battery 10, illustrated in FIG. 1, includes at least two individual active plate sets. A preferred plate set 12 is illustrated in FIG. 2 and also shown in FIG. 1, but other configurations and constructions of the plate set are known in the art. The present invention is operable with any configuration of plate set, and is not limited by the following description of the preferred plate set.

Referring to FIG. 2, the plate set 12 comprises an annular cathode or positive electrode 14 and an annular anode or negative electrode 16. An electrolyte-containing annular separator 18 physically separates the electrodes 14 and 16, and also supplies the electrolyte medium through which ionic and electron transfer occur. Charging and discharging of the plate set 12 are accomplished through electrical leads 20.

The positive electrode 14 is formed by impregnating nickel hydroxide into porous sintered nickel that is supported on a nickel screen electrode substrate, and is about 0.030 inches thick. The negative electrode 16 is coated on one side by a sintered mixture of platinum black deposited upon conductive particles in a polytetrafluoroethylene binder and on the other side with a porous layer of polytetrafluoroethylene 22. These layers are applied to a nickel substrate in the form of etched sheet or a woven mesh, to form the negative electrode 16.

Many different types of separators 18 have been used, including, for example, asbestos, nylon, and a cloth of zirconium oxide-yttrium oxide. The separator is typically about 0.012 inches thick. The electrolyte is impregnated into the separator 18 in this flight-type cell. The electrolyte is typically a 26-31 percent solution of potassium hydroxide solute in water.

The individual plate sets 12 may be assembled together to form a stacked array, termed the cell stack 24. In forming the cell stack 24, a polypropylene screen 26 about 0.016 inch thick is placed between each plate set 12 so that hydrogen gas, one of the active materials, can flow into and out of the stack freely and so that oxygen liberated during overcharging at each positive electrode 14 can diffuse away from the electrode 14 and to the negative electrode 16 to combine with hydrogen.

Charging is accomplished by passing current through the leads 20 across each plate set 12 so that electrons flow from the electrode 14 to the electrode 16. Electrical energy is thereby stored in each plate set in the form of chemical energy, for subsequent discharging to produce usable electrical energy. Discharge is accomplished by a reverse flow of electrons and electrochemical reaction. Each plate set 12 may be charged and discharged through thousands of cycles without apparent physical damage to the components, if the charging and discharging are accomplished properly. A number of cell stacks 24, preferably two, may be combined in series arrangements to produce a battery with the required voltage characteristics, in the manner to be described subsequently.

Figure 2:
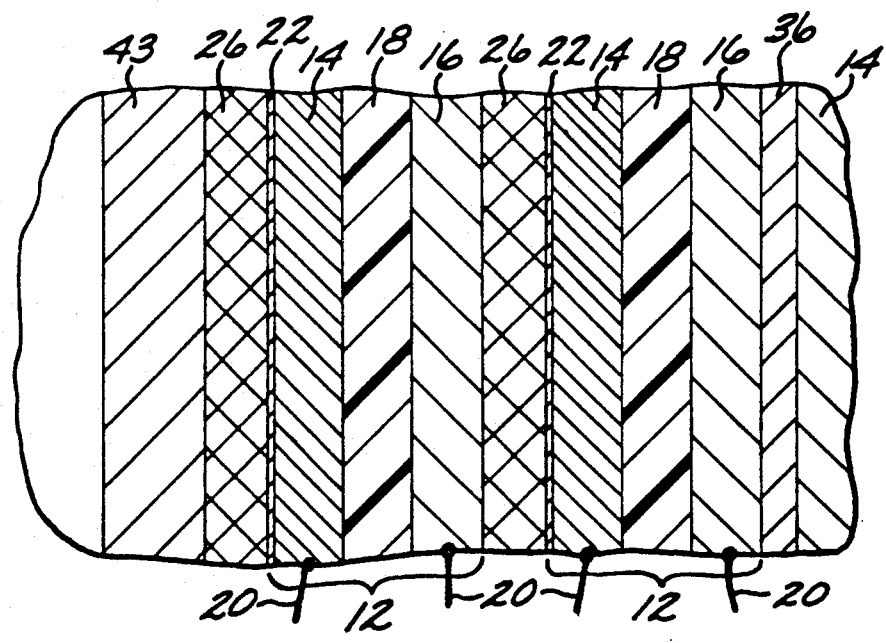
FIG. 2 is an enlarged detail of the plate set and battery stack region of FIG. 1, taken generally in the area denoted "2".

The active plate sets 12, assembled in cell stacks 24, are sealed into a pressure vessel 30, illustrated in FIG. 1. The pressure vessel 30 is manufactured of a material such as Inconel 718 nickel-based alloy which can withstand internal pressures on the order of 1,000 psi, without damage by hydrogen embrittlement or corrosion by the electrolyte. The pressure vessel 30 is typically constructed in the form of a cylindrical tube having domed ends. By way of illustration, the pressure vessel 30 has external dimensions of about 3½ inches diameter and several inches long, the actual length depending upon the desired storage capacity.

The interior of the pressure vessel 30 is divided into two hermetically sealed compartments, a first compartment 32 and a second compartment 34, by an impermeable membrane 36. Preferably, the impermeable membrane 36 lies transverse to a cylindrical axis 38 of the pressure vessel 30, at the midpoint of the pressure vessel 30. The membrane 36 thus divides the pressure vessel 30 into the two compartments 32 and 34 of equal size, shape, and volume, one inverted over the other.

The cell stacks 24 are placed into the two compartments. For clarity of illustration, FIG. 1 depicts a single cell stack in each of the compartments 32 and 34, a first cell stack 40 in compartment 32 and a second cell stack 42 in compartment 34. The cell stacks 40 and 42 would include the same number of plate sets. Two end plates 43 are placed at the opposing ends of the cell stacks 40 and 42, and a compressive force is applied to the cell stacks 40 and 42 through a clamping mechanism (not shown) of the type well known in the art. A feature of the present structure is that only two end plates are required for the two cell stacks 40 and 42, rather than two end plates for each cell stack, thereby saving weight and increasing the specific energy of the battery. A further reduction in weight is achieved by shortening the cell stack by the reduced component requirements and shorter electrical leads 20. Moreover, the structure of the present battery utilizes the dead space between the cylinders of the pressure vessels more efficiently than does a two-cell battery containing two individual pressure vessel (IPV) cells, thereby improving the volumetric energy density of the battery.

In the first cell stack 40 of the first compartment 32, the various plate sets are connected in parallel. A positive terminal 44 is connected to each of the same type of electrode, illustrated as the positive electrode 14. Each of the other type of electrode, illustrated as the negative electrode 16, is connected to an internal bus bar 46, which optionally may be insulated from the membrane 36 by use of a compressed seal with polytetrafluoroethylene, for example.

In the second compartment 34, the plate sets of the second cell stack 42 are also connected in parallel, but in a fashion opposite to that of the first cell stack. A negative terminal 48 is connected to each of the negative electrodes 16. Each of the positive electrodes 14 is connected to the same internal bus bar 46, which passes through the impermeable membrane 36 to permit the conduction of electrical current but not the passage of mass through the membrane. This mode of connecting the cell stacks 40 and 42 places them in series, so that the output of the battery 10 is at twice the voltage of either of the cell stacks 40 or 42.

In this fashion, all of the plate sets of the first cell stack 40 are connected in parallel to each other, and all of the plate sets of the second cell stack 42 are connected in parallel to each other. The cell stacks 40 and 42 are connected in series. By connecting the plate sets in this manner, there can be no electrolyte migration between the first cell stack 40, and the second cell stack 42, because of the impermeable membrane 36. (It would also be acceptable to connect the two cell stacks in parallel, if desired.)

The present invention therefore provides a battery that produces a voltage twice that of an individual plate set, with a current determined by the number of plate sets within the cell stack of each compartment. Dividing the cell stacks contained within the pressure vessel into two groups separated by an impermeable membrane and connected in the manner illustrated aids in achieving long-term stability of the battery by preventing internal electrolyte migration.

Although a particular embodiment of the invention has been described in detail for purposes of illustration, various modifications may be made without departing from the spirit and scope of the invention. Accordingly, the invention is not to be limited except as by the appended claims.

What is claimed is:

1. A battery, comprising:
   a pressure vessel;
   an internal impermeable membrane within the pressure vessel dividing the pressure vessel into two compartments hermetically sealed against mass flow between the compartments;
   storage means for storing electrical energy, the storage means including at least one active plate set in each of the compartments of the pressure vessel.

2. The battery of claim 1, wherein each plate set includes a positive electrode, a negative electrode, a separator between the positive electrode and the negative electrode, a gas screen, and an electrolyte.

3. The battery of claim 2, wherein the positive electrode is a nickel electrode, the negative electrode is a hydrogen electrode.

4. The battery of claim 2, wherein the electrolyte comprises an aqueous solution of potassium hydroxide.

5. The battery of claim 1, wherein the membrane divides the pressure vessel into two compartments of equal size, shape, and volume.

6. The battery of claim 1, wherein the pressure vessel is formed as a cylindrical container with domed ends.

7. The battery of claim 6, wherein the membrane extends transversely to a cylindrical axis of the container, and divides the pressure vessel into two compartments of equal size, shape, and volume.

8. The battery of claim 1, wherein there is more than one active plate set in each compartment, and the active plate sets within each compartment are connected in parallel.

9. The battery of claim 1, wherein the active plate set in one of the compartments is connected in series with the active plate set in the other of the compartments.

10. A battery, comprising:
    a pressure vessel;
    an internal impermeable membrane within the pressure vessel dividing the pressure vessel into a first compartment and a second compartment hermetically sealed against mass flow between the compartments; and
    storage means for storing electrical energy, the storage means including
    at least two active plate sets in the first compartment, the active plate sets in the first compartment being electrically connected in parallel,
    at least two active plate sets in the second compartment, the active plate sets in the second compartment being electrically connected in parallel, the active plate sets in the first compartment being electrically connected in series with the active plate sets in the second compartment.

11. The battery of claim 10, wherein each plate set includes a positive electrode, a negative electrode, a separator between the positive electrode and the negative electrode, a gas screen, and an electrolyte.

12. The battery of claim 11, wherein the positive electrode is a nickel electrode, the negative electrode is a hydrogen electrode.

13. The battery of claim 11, wherein the electrolyte comprises an aqueous solution of potassium hydroxide.

14. The battery of claim 10, wherein the membrane divides the pressure vessel into two compartments of equal size, shape, and volume.

15. The battery of claim 10, wherein the pressure vessel is formed as a cylindrical container with domed ends.

16. The battery of claim 15, wherein the membrane extends transversely to a cylindrical axis of the container, and divides the pressure vessel into two compartments of equal size, shape, and volume.

17. A battery, comprising:
    a cylindrical pressure vessel having domed ends and a cylindrical axis;
    an internal impermeable membrane extending transversely to the cylindrical axis of the pressure vessel, the membrane dividing the pressure vessel into a first compartment and a second compartment of equal size, shape, and volume, the membrane sealing the two compartments against mass flow between the two compartments;
    storage means for storing electrical energy, the storage means including a plurality of plate sets, each plate set including a nickel positive electrode, a hydrogen negative electrode, a separator between the positive electrode and the negative electrode, a gas screen, and an electrolyte, the active plate sets being arranged with
    at least two active plate sets in the first compartment, the active plate sets in the first compartment being electrically connected in parallel,
    at least two active plate sets in the second compartment, the active plate sets in the second compartment being electrically connected in parallel, the active plate sets in the first compartment being electrically connected in series with the active plate sets in the second compartment.

* * * * *